(12) United States Patent
Lessing et al.

(10) Patent No.: US 11,648,663 B2
(45) Date of Patent: May 16, 2023

(54) SOFT ROBOTIC ACTUATORS UTILIZING ASYMMETRIC SURFACES

(71) Applicant: SOFT ROBOTICS, INC., Bedford, MA (US)

(72) Inventors: Joshua Aaron Lessing, Cambridge, MA (US); Ryan Richard Knopf, Cambridge, MA (US); Noel McLellan, Salisbury, MA (US)

(73) Assignee: SOFT ROBOTICS, INC., Bedford, MA (US)

( * ) Notice: Subject to any disclaimer, the term of this patent is extended or adjusted under 35 U.S.C. 154(b) by 38 days.

(21) Appl. No.: 17/340,337

(22) Filed: Jun. 7, 2021

(65) Prior Publication Data
US 2021/0291361 A1 Sep. 23, 2021

Related U.S. Application Data

(63) Continuation of application No. 16/042,459, filed on Jul. 23, 2018, now Pat. No. 11,027,423, which is a continuation of application No. 14/734,719, filed on Jun. 9, 2015, now Pat. No. 10,974,382.

(60) Provisional application No. 62/009,659, filed on Jun. 9, 2014.

(51) Int. Cl.
| | | |
|---|---|---|
| *B25J 9/14* | (2006.01) | |
| *F15B 15/10* | (2006.01) | |
| *B25J 15/10* | (2006.01) | |
| *B25J 15/06* | (2006.01) | |
| *B25J 15/12* | (2006.01) | |
| *B25J 15/00* | (2006.01) | |

(52) U.S. Cl.
CPC .......... *B25J 9/142* (2013.01); *B25J 15/0616* (2013.01); *B25J 15/10* (2013.01); *B25J 15/12* (2013.01); *F15B 15/103* (2013.01); *B25J 15/0023* (2013.01)

(58) Field of Classification Search
CPC ........ B25J 9/0029; B25J 9/0025; B25J 9/142; B25J 15/0023; B25J 15/12; F16B 15/103
See application file for complete search history.

(56) References Cited

U.S. PATENT DOCUMENTS

| | | | | |
|---|---|---|---|---|
| 2010/0258362 | A1* | 10/2010 | Trimmer | B08B 9/045 |
| | | | | 180/7.1 |
| 2013/0110089 | A1* | 5/2013 | Kappel | A61B 1/00098 |
| | | | | 606/1 |
| 2014/0083230 | A1* | 3/2014 | Calisti | B25J 15/12 |
| | | | | 901/21 |
| 2016/0052131 | A1* | 2/2016 | Lessing | B25J 15/12 |
| | | | | 361/679.01 |

FOREIGN PATENT DOCUMENTS

| | | | | |
|---|---|---|---|---|
| FR | 2965501 A1 * | 4/2012 | .......... | B25J 15/0009 |
| JP | 3003702 B2 * | 10/1989 | ............. | B25J 19/00 |

* cited by examiner

*Primary Examiner* — Bobby Rushing, Jr.
(74) *Attorney, Agent, or Firm* — Goodwin Procter LLP

(57) ABSTRACT

A soft robotic actuator is disclosed. The actuator includes a first portion with a substantially constant profile and a second portion with a regularly varying profile, and bends in a pressure-dependent fashion as the internal pressure within the actuator is increased or decreased.

20 Claims, 17 Drawing Sheets

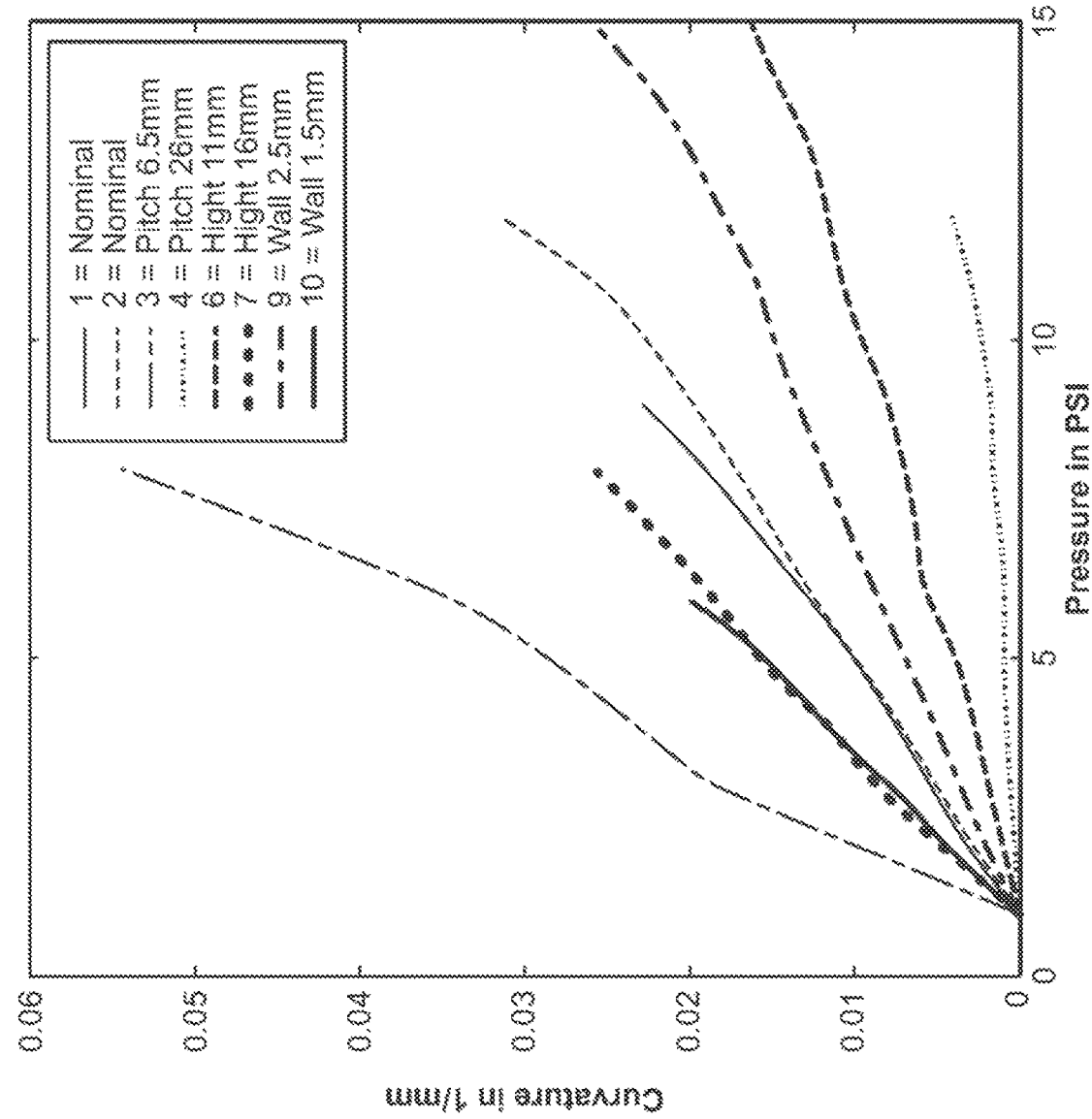
FIG. 4A
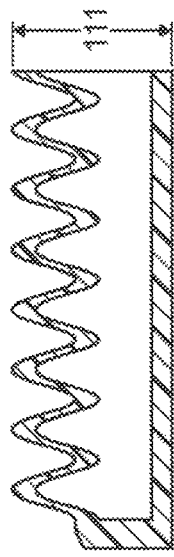
FIG. 4B #3
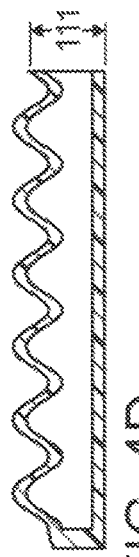
FIG. 4C #6
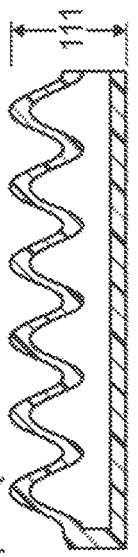
FIG. 4D #7
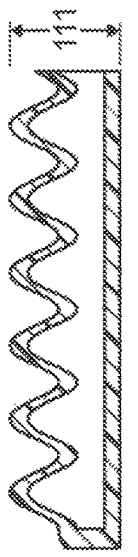
FIG. 4E #9

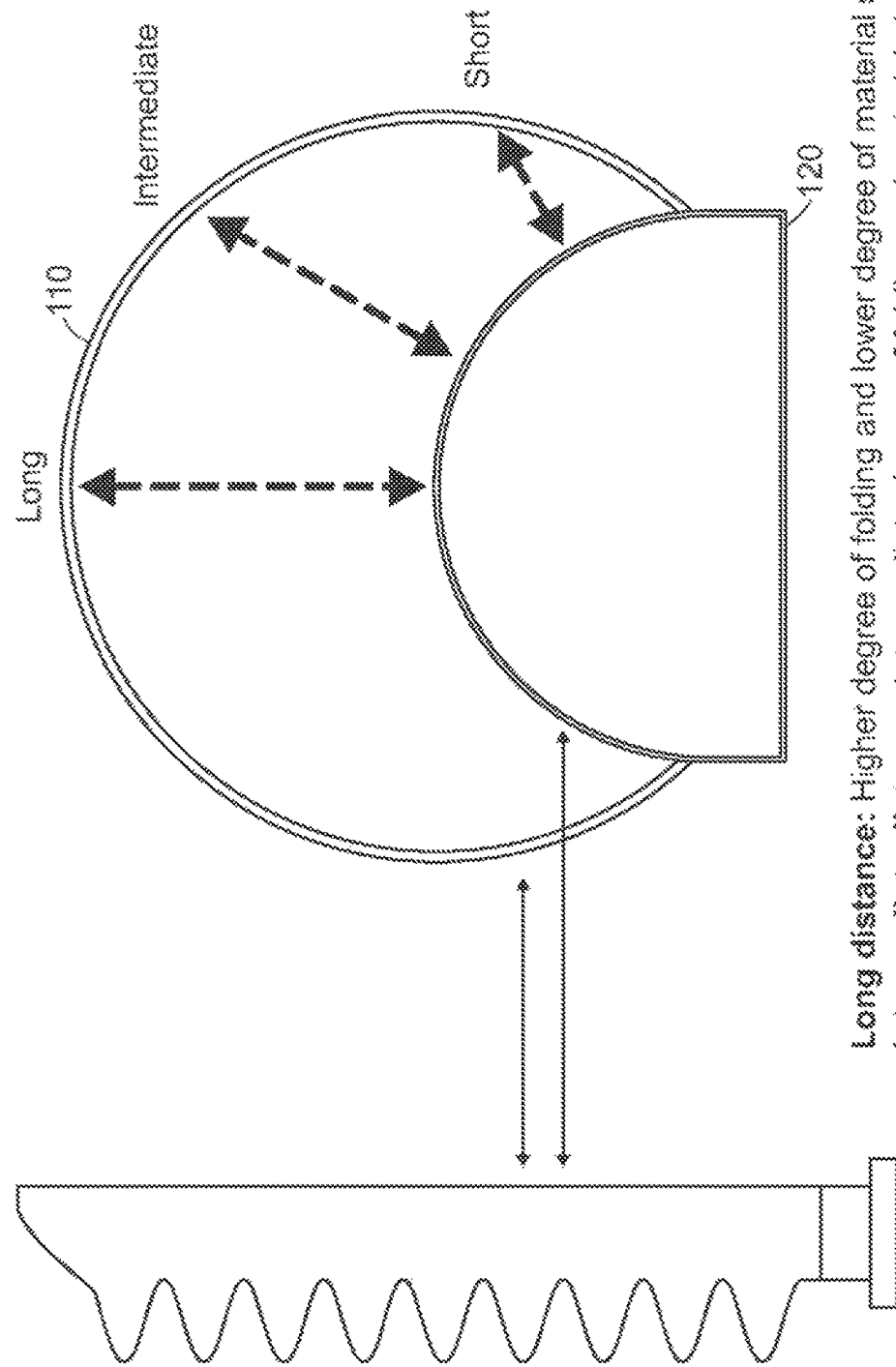

a > b

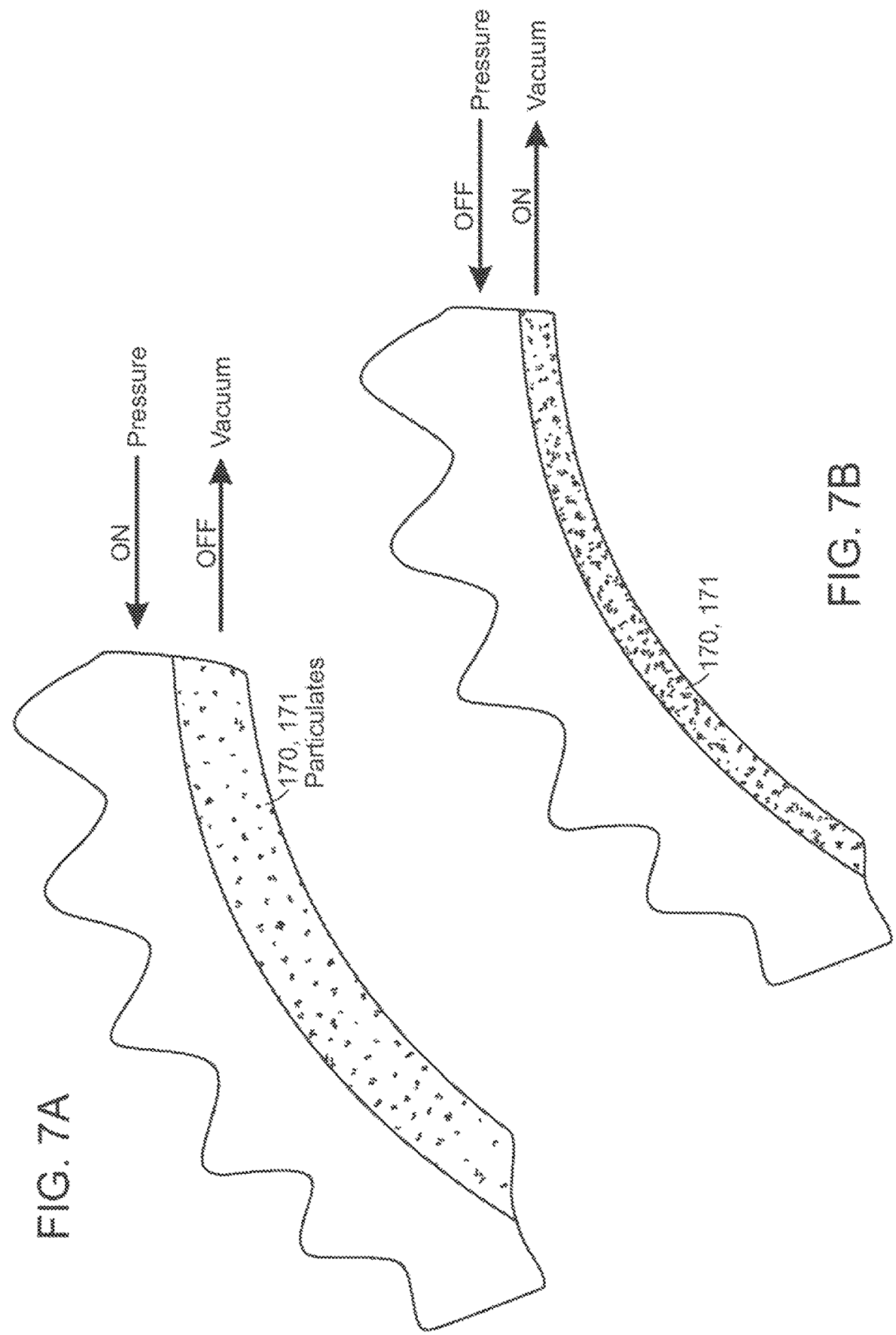

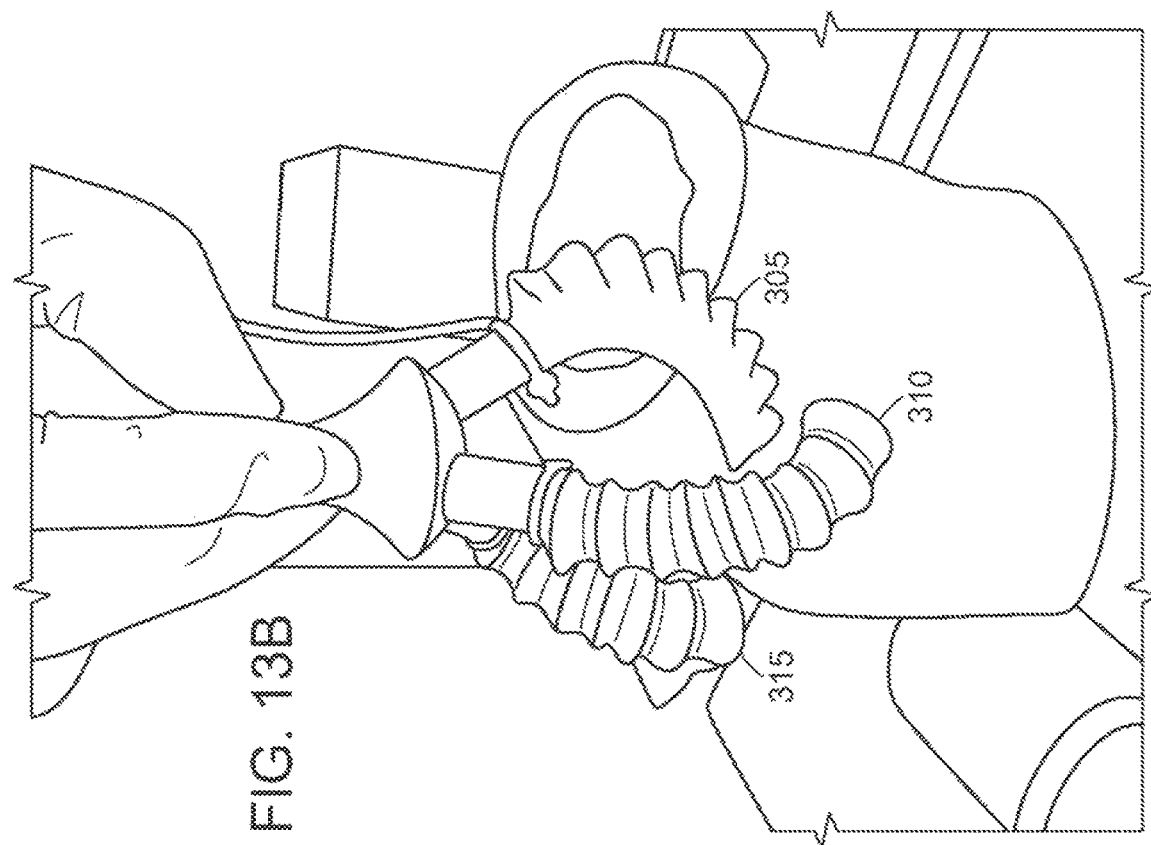
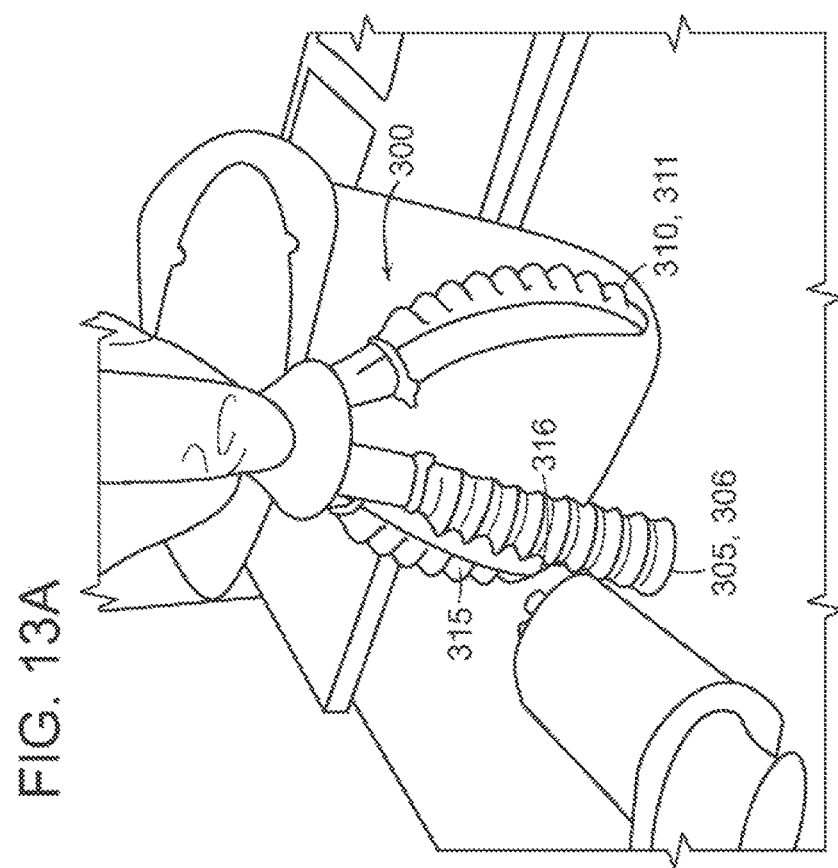

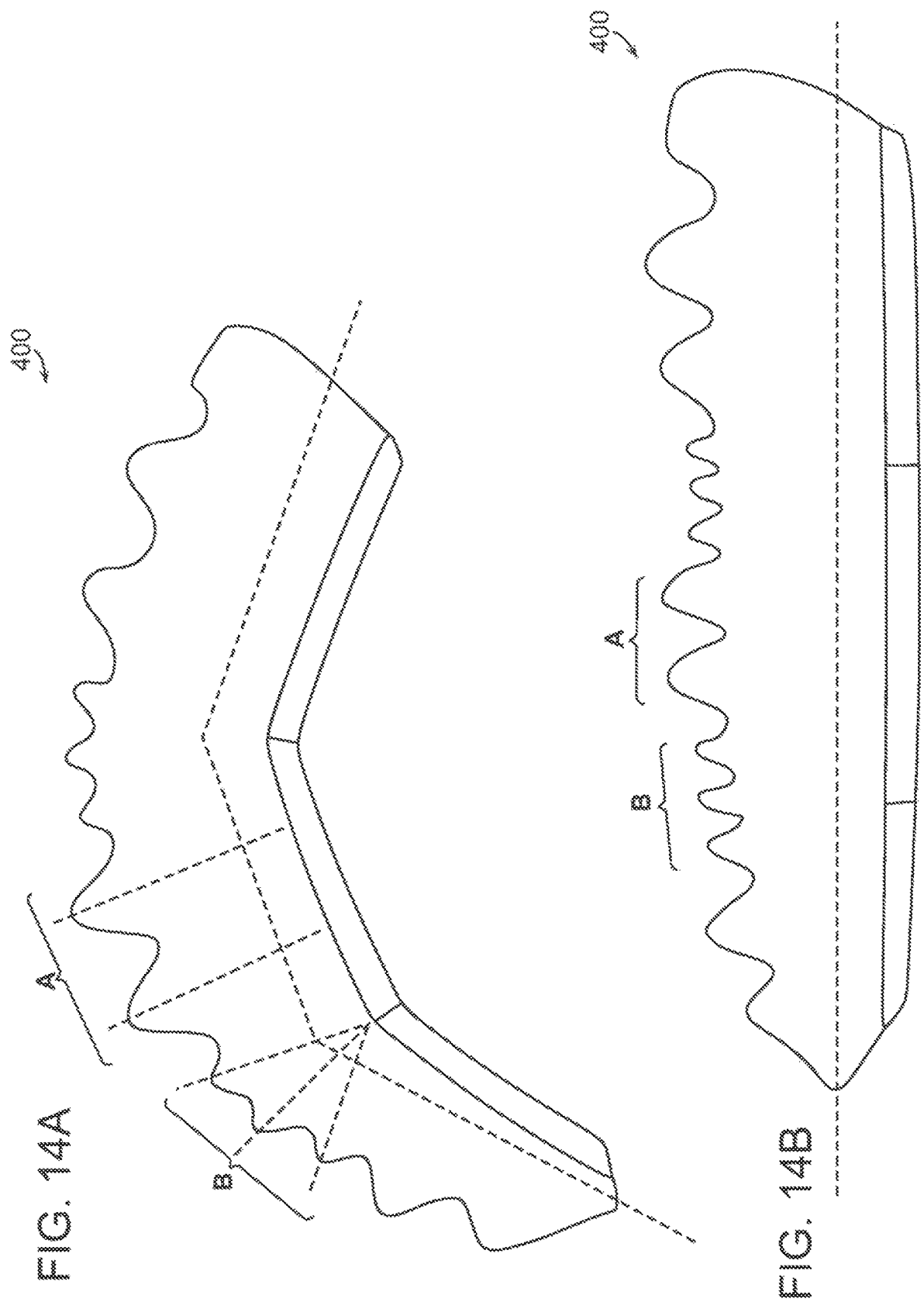

FIG. 16A  Front:
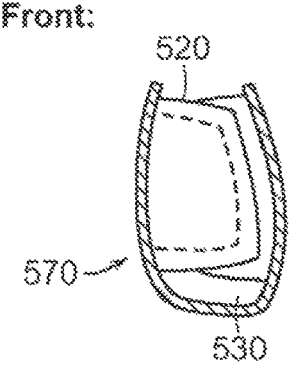
FIG. 16B  Right:
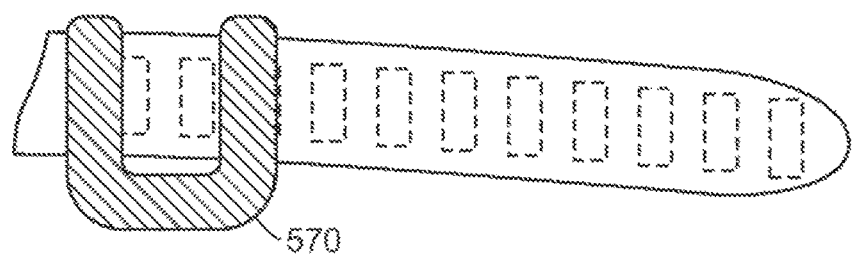
FIG. 16C  Top:   Isometric:
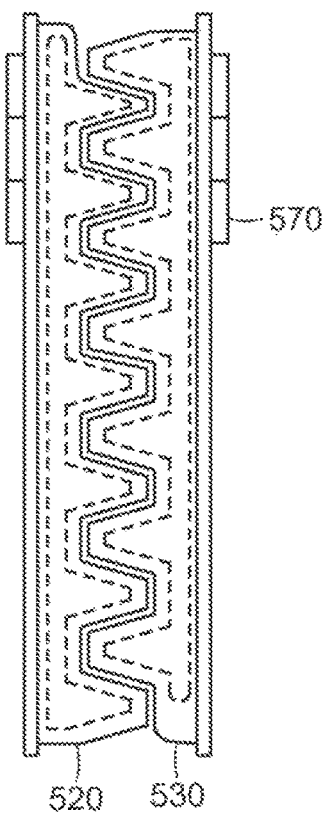

SOFT ROBOTIC ACTUATORS UTILIZING ASYMMETRIC SURFACES

RELATED APPLICATIONS

The present application is a Continuation of U.S. patent application Ser. No. 16/042,459 filed on Jul. 23, 2018, which is a Continuation of U.S. patent application Ser. No. 14/734,719 filed on Jun. 9, 2015, now U.S. Issued U.S. Pat. No. 10,974,382, which claims priority to U.S. Patent Application No. 62/009,659, filed on Jun. 9, 2014. The contents of the aforementioned application are incorporated herein by reference.

This application is a Continuation of related to International Patent Application Publication No. WO2012/148472 by Ilievsky et al. The entire disclosure of this reference, and any other reference listed in the body of this specification, is hereby incorporated by reference in its entirety for all purposes.

FIELD OF THE DISCLOSURE

The disclosure relates generally to flexible actuators, and more particularly to soft robotic manipulators.

BACKGROUND

A "robot" is an automatically controlled, programmable, multipurpose manipulator which can function at a fixed location, or in motion. Robotics is a field of enormous (and growing) importance, in fields from assembly to surgery. Most robotic systems are "hard", that is, composed of metallic structures with joints based on conventional bearings. These structures are often modeled after animal limbs (although structures not found in nature—for example, wheels and treads—are also common in mobile robots).

In an effort to build robots that can carry out sophisticated tasks in unstructured environments, researchers continue to emulate living creatures and their materials, morphology and movements. Over the last several years, soft robotic manipulators have generated significant interest due to their wide range of potential applications that are challenging for "hard" robots. For example, soft robots can handle delicate objects such as eggs because the surface of soft robots can conform to the shape of the handled objects. Soft robots can also fit into places that are challenging for hard robots. For instance, a soft robot can fit under a door jam by deflating itself. In addition, soft robots can move in an environment that are challenging for hard robots. For instance, soft robots can maneuver on non-stiff surfaces, such as mud, clay, gel, or in fluids such as water.

One way to build a soft robotic manipulator is by integrating rigid robotic skeletons with soft skins or compartments. However, these structures can only move in limited ways. In addition, rigid skeletons may not be suited for many applications, such as manipulating delicate objects or objects with significant part-to-part variance.

Pneumatic artificial muscles, such as McKibben actuators, are contractile or extensional devices operated by pressurized air. McKibben-type actuators have a simple structure consisting of an internal bladder wrapped in a braided mesh shell. The braided mesh shell includes flexible yet non-extensible threads oriented at a bias around the bladder. When the internal bladder is pressurized, the pressurized air pushes against the inner bladder surface and external shell, causing the bladder to expand. Like the Chinese finger puzzle, the braided mesh shell shortens in a scissor-like action due to the non-extensibility of the threads. As the braided mesh shell shortens, the actuator shortens accordingly, thereby exerting a force in the direction of contraction. These actuators can be fast and can have length-load dependence similar to that of muscles, but possess only one mode of actuation—contraction and extension.

Soft robots, or soft robotic actuators, can be most easily identified by the materials used in their manufacture and their methods of actuation. The field of soft robotic actuation began with work by Kuhn et al in 1950. Kuhn et al focused on the reversible change of a polymeric material, namely the coiling and uncoiling. The reversible change of a polymeric material depends on the acidity of the surrounding medium. Kuhn et al leveraged this property to successfully move a weight. This demonstrated the possibility of using soft materials in robotic actuation. Hamlen et al extended this idea in 1965 and showed that polymeric materials can be contracted electrolytically.

Kuhn et al and Hamlen et al set the scene for using the polymeric gels for soft robotics. In particular, Otake et al demonstrated the use of electro-active polymers in the manufacture of starfish-shaped robotic actuators. Also, in 1996, Suzumori et al demonstrated pneumatically-driven soft actuators. These actuators were configured to respond to pressurization of sealed chambers fabricated from extensible polymers. This type of actuation has been used on the millimeter scale to fabricate grippers, tentacles, and other related devices including pneumatic balloon actuators.

As the field has progressed, there has been an ongoing need to develop compliant actuators with actuation dynamics adapted to the growing list of applications for soft robotic devices. There is also a need in the field for design frameworks for the development of new actuators based on quantitative modeling and the manipulation of a relatively small number of actuator parameters.

SUMMARY

The present invention addresses the needs described above by providing actuators that are configured to perform new fundamental motions through the inclusion of design elements which can be configured, through the manipulation of a relatively short list of parameters, to undergo specific pressure-actuated changes which can be designed using quantitative modeling techniques.

In one aspect, the present invention relates to a soft robotic actuator that includes a flexible or elastic elongate body that defines a sealed void which can be pressurized or depressurized relative to the environment surrounding the actuator. The elongate body includes a first wall portion with a substantially uniform shape or profile and, opposite the first wall portion, a second wall portion with a repeating variable wall portion. The internal height of the elongate body varies over its length. Pressurizing or depressurizing the flexible or elastic elongate body causes at least a part of the flexible or elastic elongate body, and thus the actuator, to bend. The profile of the second wall portion is characterized by a maximal wall height, a minimal wall height, and a pitch (measured as the peak-to-peak distance between adjacent repeating segments, each of which is capable of undergoing actuation in response to internal pressurization, or "unit cells"). Each of these parameters, as well as the wall thickness of the elongate body, can be varied to "tune" the actuator's pressure sensitivity, i.e. to cause the actuator to curve at a pre-determined rate in response to changes in the internal pressure of the flexible or elastic elongate body. In some cases, the flexible or elastic elongate body defines a lumen extending between the proximal and distal ends of the elongate body, which lumen is permanently or reversibly (e.g. by means of a valve) open to the exterior of the device at the distal end. The lumen can be connected, variously, to a source of pressure (including negative pressure), a source of fluid, or a medical device that includes an elongate portion which is capable of being inserted into and passed or extended through the lumen to reach the exterior of the device. The distal opening of the lumen can include a suction cup, and the flexible or elastic elongate body can generally incorporate useful tools such as cutting implements (e.g. blades, scalpels, etc.), hooks, and needles at its distal end. In some cases the soft robotic actuator includes a chamber containing a granular material that is normally pliant but which becomes rigid when air is evacuated from the chamber by the application of a vacuum.

In another aspect, the present invention relates to a soft robotic actuator which includes two or more (i.e. a plurality of) flexible elongate bodies as described above. The elongate bodies are optionally placed in a parallel arrangement in which their first wall portions are proximate one another and face inward, while their second wall portions face outward.

In another aspect, the present invention relates to a medical device that includes two or more (i.e. a plurality of) soft robotic actuators arranged to define a grasping member (i.e. a device which can grasp and release an object). Each actuator includes one or more flexible elongate bodies as described above.

In still another aspect, the present invention relates to a medical device that includes an elongate element and a plurality of soft robotic actuators as described above. The elongate element defines one or more lumens connected to the voids within each actuator. In various embodiments, the device includes an enclosing element that is removably or reversibly disposed about the actuators to reduce mechanical interference with the body during insertion of the device. In some cases, the device includes two actuators connected to the distal end of the elongate member via a "Y" joint. A spring for urging the actuators apart may be disposed at the Y joint in some cases.

In still another aspect, the present invention relates to the use of a device according to an embodiment of the invention to treat a patient by inserting it into the body of the patient and actuating an actuator to grasp a portion of the patient's body.

BRIEF DESCRIPTION OF THE DRAWINGS

FIG. 4A-E illustrate how varying certain physical parameters of actuators according to the present invention alters their pressure sensitivity (i.e. the degree to which they curve in response to changes in internal pressure).

FIG. 5A-B illustrate certain physical dimensions of an actuator according to an embodiment of the invention.

FIG. 7A-B are a schematic view of an actuator incorporating a rigidizing granular material according to certain embodiments of the present invention.

FIG. 13A-B show photos of a grasper that incorporates soft robotic actuators according to another embodiment of the present invention.

FIG. 14A-B show a complex actuator according to an embodiment of the present invention.

FIG. 16A-C show a portion of a surgical instrument according to an embodiment of the invention packaged for deployment.

DETAILED DESCRIPTION OF THE PREFERRED EMBODIMENTS

Figure 1A:
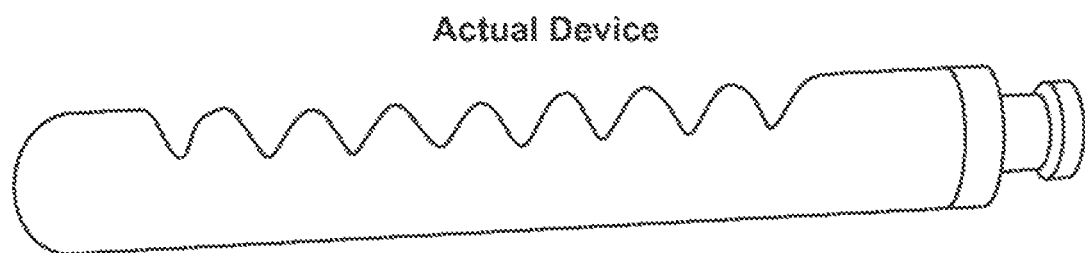
FIG. 1A-D include a photograph and three schematic views of an exemplary soft robotic actuator.
Figure 1B:
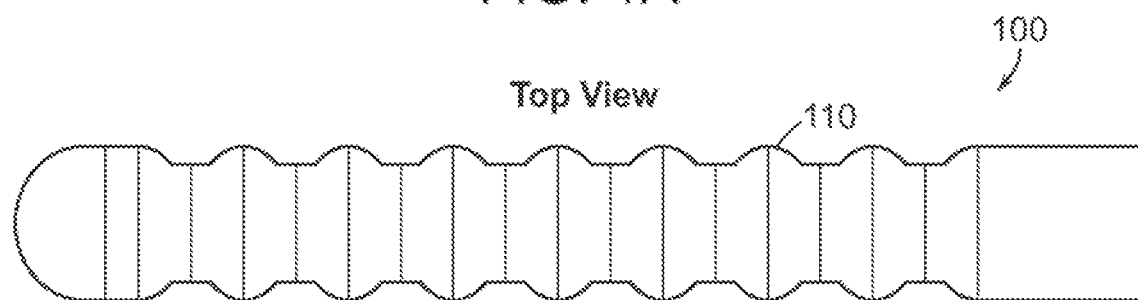
Figure 1C:
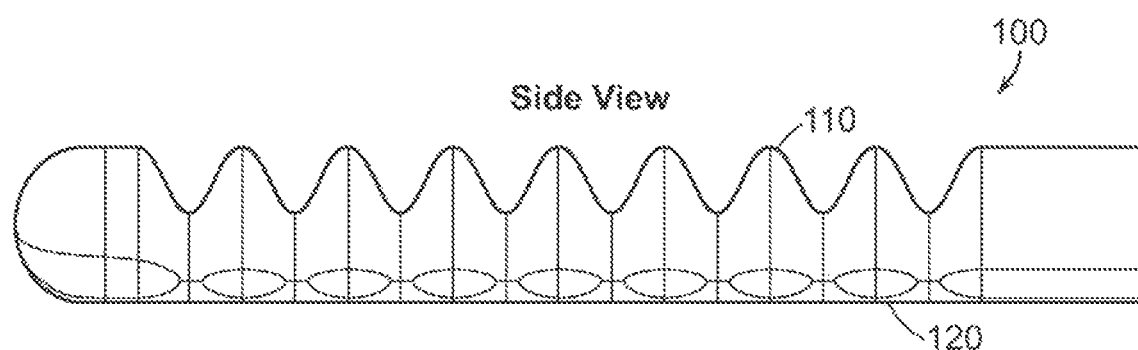
Figure 1D:
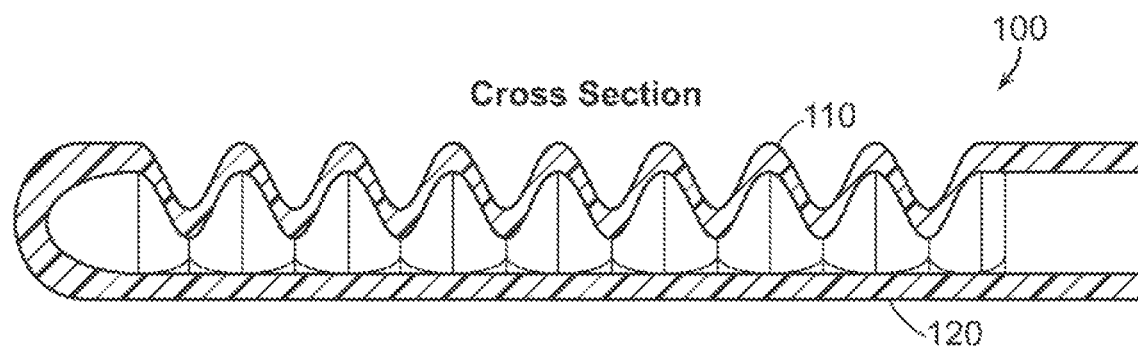

The present invention will now be described more fully hereinafter with reference to the accompanying drawings, in which preferred embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

In accordance with the present disclosure, a compact, portable, "soft robotic" actuator which bends or otherwise alters its profile upon changes in curvature induced by extension of programmed unfolding and straining regions of the actuator is provided. Actuators according to various embodiments of the invention utilize a kinematically motivated ratio of arc lengths between opposing faces on the actuator. These arc length ratios are selected so that the actuator unfolds or folds to a predetermined final profile. The final profile may include any shape or combination of shapes that are useful for a particular application. For instance, the final profile may bend, twist, extend, and/or contract the actuator.

Actuators according to the invention, as described more fully herein, have several advantages relative to existing actuator designs: first, actuators according to the invention generally (though not necessarily) have linear actuation profiles, meaning that they undergo a fixed displacement (e.g. a reduction or increase in the radius of curvature, or a linear displacement of a distal end of the actuator relative to the proximal end). Second, actuators according to the present invention generally have a broad and highly tunable dynamic range, which is an improvement over the more stepwise action of many currently used actuators in which the actuation occurs over a small range above a threshold. Values below this threshold are essentially a dead-zone for purposes of controlling the actuators. Third, actuators designed according to the principles of the present invention undergo significantly less (e.g. four-fold or five-fold less) strain than existing actuator designs, reducing the likelihood of failure over multiple actuation cycles and improving the reproducibility of actuation between cycles. Fourth, the present invention includes a framework for designing actuators in which relatively few parameters can be varied to tune actuation profiles, simplifying the design and modeling of actuators for specific applications, which reduces the need for physical prototyping of actuator designs, shortening their time to deployment.

The resistance of the actuator to changes in curvature is determined by strain induced in the materials from which the body is constructed. Such resistance can be programmed within an extremely wide range of magnitudes, and may be modulated through the selection of specialized elastomeric or non-elastomeric materials and body geometries. In this way, the resistance of the actuator to changing curvature may have a controlled functional relationship to applied pressure or vacuum (linear, exponential, logarithmic, sinusoidal, etc.) and this functional relationship may be intentionally varied at different locations within the actuator. As an example, in some embodiments of the invention, a periodic "accordion" shaped face is used opposing a flat face to provide the proper relative arc lengths for uniform bending and ensure that strain response is linear with respect to bending curvature. This can be viewed as similar to the mechanics of an extending or compressing helical spring.

The functionality of this actuator can be enhanced by incorporation of additional features such as a jamming chamber to rigidize the actuator on command, suction cups along the surface of the actuator to enhance gripping, and inclusion of nitinol wire or mesh to provide a combination of fluid and electromechanical actuation.

Actuators and design features discussed herein are, in various embodiments of the invention, integrated into a variety of actuating structures, including without limitation multi-chambered tentacles, multi-fingered grippers, surgical retractors, minimally invasive surgical devices, and a multitude of other soft robotic assemblies.

Referring to FIG. 1, an exemplary soft actuator 100 according to certain embodiments of the invention includes opposing folding 110 and non-folding 120 portions. FIG. 1A is a photograph of the soft actuator, while FIGS. 1B-D show various schematic views of the actuator 100, including a cross section FIG. 1D illustrating the spatial relationship between folding 110 and non-folding 120 portions.

Figure 2A:
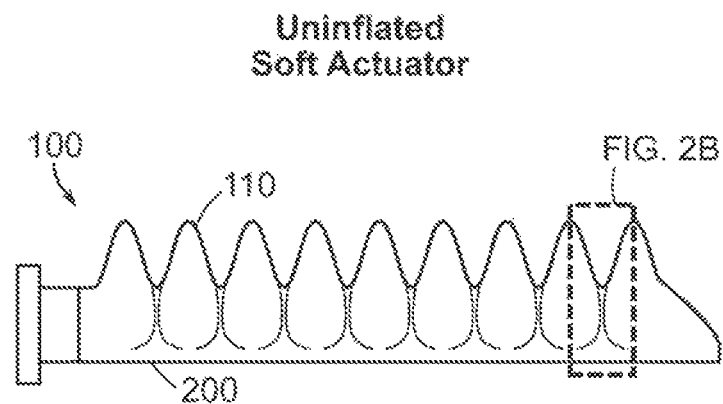
FIG. 2A-D show four separate schematic views of an exemplary soft robotic actuator.
Figure 2B:
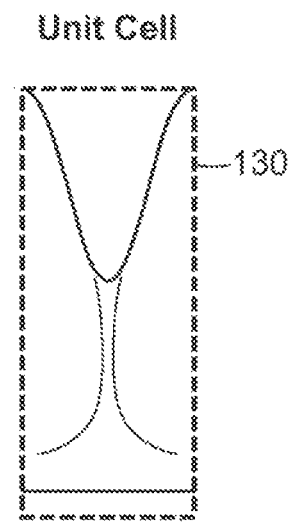
Figure 2C:
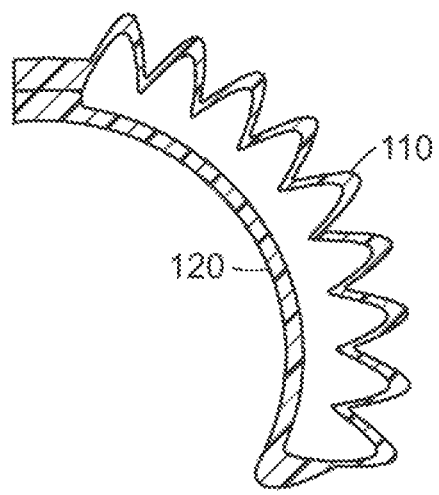
Figure 2D:
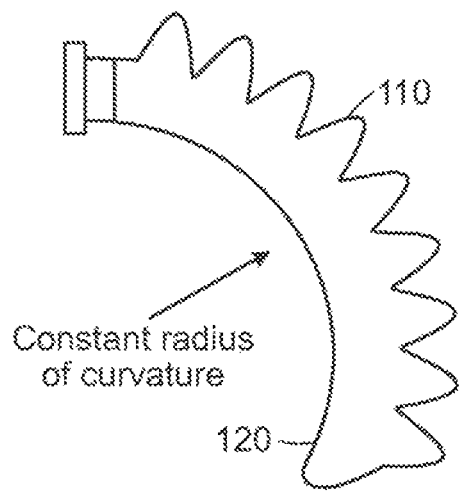

Turning to FIGS. 2A-B, soft actuators 100 according to the invention generally include one or more unit cells 130, each cell 130 in turn including a single folded portion 110 on the opposing side of an actuator from a non-folded portion 120. A linear pattern of repeating, identical unit cells 130 can be combined to create a bending actuator 100 with a constant radius of curvature, as shown in FIGS. 2C-D. As FIG. 2 shows, as the internal pressure of the actuator 100 is increased, the actuator 100 curves around its non-folding portion 120. In this arrangement, the relative length of the folding portion 110 increases relative to that of the non-folding portion 120 as the internal pressure of the actuator 100 increases.

In some cases, a complex bending motion can be programed in to the structure of a soft actuator by combining a set of unit cells of different height, pitch, and wall thickness in a linear pattern to generate a bending actuator with a variable radius of curvature. By constructing a soft actuator with folds on multiple faces of the actuator it is possible to create a structure that generates multi directional bending (e.g. a helical or serpentine shape) and/or twisting upon pressurization or application of vacuum.

Figure 3A:
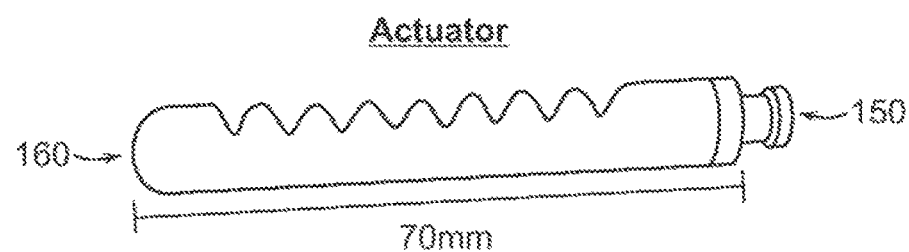
FIG. 3A-C illustrate the pressure-sensitive bending of a soft robotic actuator according to some embodiments of the present invention.
Figure 3B:
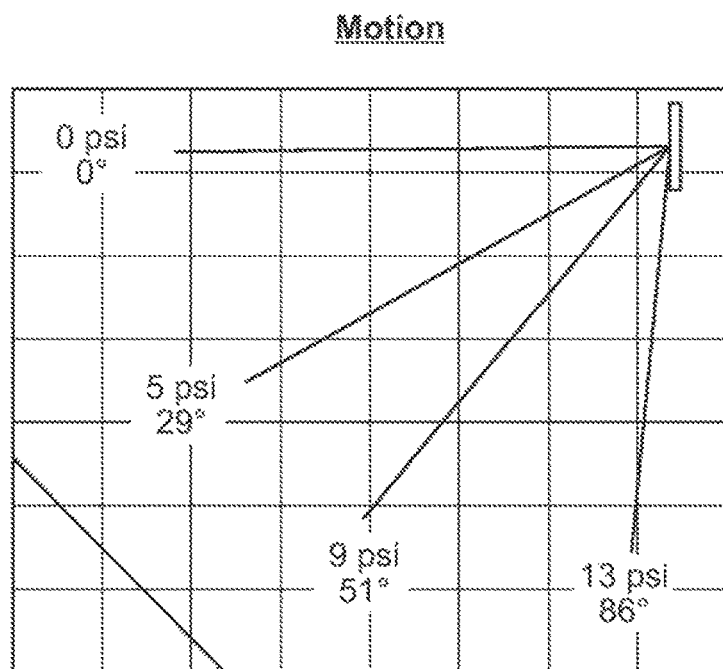
Figure 3C:
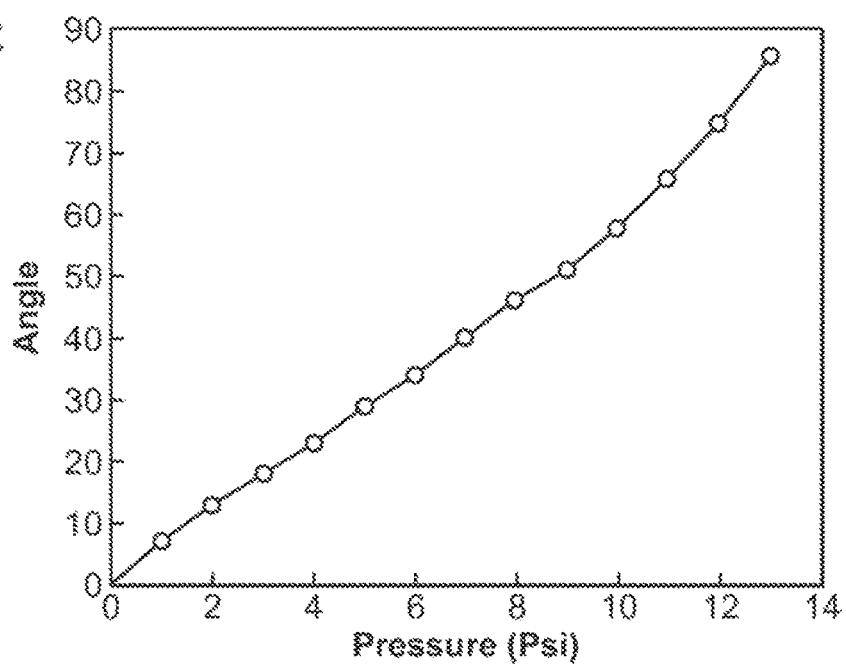

Turning now to FIG. 3A-C, the degree of actuation of actuators according to embodiments of the invention can depend linearly, or non-linearly, on the internal pressure applied to the actuator. FIG. 3A shows an actuator 100 at rest, in which the internal pressure of the actuator is equal to the external pressure (0 PSI) and the angular displacement between the proximal end 150 and the distal end 160 of the actuator is substantially zero (referred to as the degree of actuation for purposes of this disclosure). As the internal pressure within the actuator 100 increases, the angular displacement increases in a substantially linear fashion from between 0 and 90 degrees.

The relationship between the internal pressure of the actuator 100 and the degree of actuation is determined at least in part by the geometry of the folding portion 110. FIG. 4A shows the relationships between internal pressure and actuation where the various folding portions 110 are characterized by (i) different maximal wall heights 111 as measured from the internal surface of the non-folding portion 120 (ii) different pitch distances, as measured from peak-to peak within a unit cell 130, and (iii) different wall thicknesses. In general, increasing the height tends to increase the pressure sensitivity of the actuator 100, while increasing the wall thickness and the pitch tend to decrease its pressure sensitivity. Advantageously, the actuation profiles of actuators according to various embodiments of the invention are generally linear over a broad range of pressures up to 15 PSI in some cases, and are responsive to pressures at a thresholds near zero PSI. By contrast, existing actuator designs are generally characterized by shorter dynamic ranges of, for instance, 3 or 4 PSI, and often times have higher pressure response thresholds than those observed in FIG. 4. As a consequence, existing actuator designs are generally less controllable, as they have larger control "dead zones" and go from zero actuation to full actuation over a relatively narrow pressure range, necessitating relatively fine control of applied pressures in order to achieve control over the degree of actuation.

Another advantage of actuator designs according to the present invention is their minimization of strain caused by actuation through the incorporation of alternating "long" and "short" wall segments within the folding regions 110, as shown in FIG. 5. In actuators according to various embodiments of the present invention, expansion of the folding region 110 is driven in part by the unfolding of these structures rather than solely by elongation due to strain as in existing actuator designs. The minimization of strain in actuators of the present invention generally improves the consistency (i.e. the reproducibility) of the actuation path across multiple cycles, and reduces the risk of mechanical failure due to material fatigue after multiple actuation cycles. By contrast, conventional actuator designs, in which actuation is generally accompanied by substantially greater strain, are more prone to hysteresis and may be more prone to failure after repeated cycles.

Figure 6A:
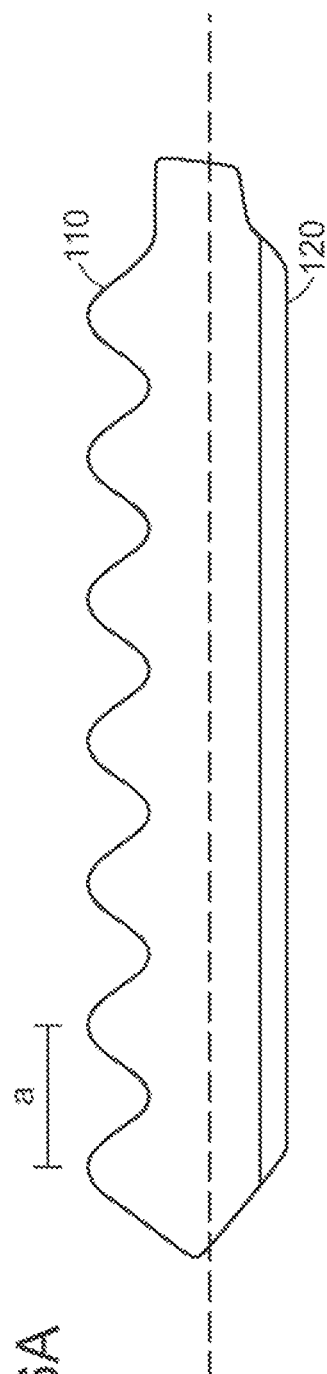
FIG. 6A-B are a schematic view of an actuator according to the present invention bending in response to the application of an internal vacuum.
Figure 6B:
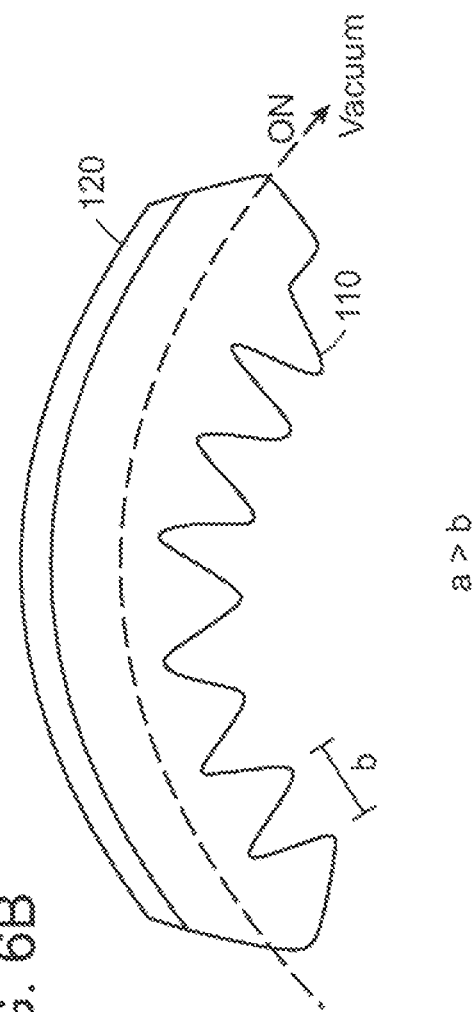

While the foregoing examples have focused on actuation driven by increasing internal pressure within the actuator, in preferred embodiments, actuator 100 is also able to actuate in reverse in response to decreased internal pressure, as shown in FIG. 6A-B. As the internal pressure within the actuator 100 is decreased, the relative length of the folding portion 110 decreases relative to that of the non-folding portion 120 as the width of each unit cell 130 decreases and the walls of the folding portion 110 are drawn together, thereby decreasing the radius of curvature of the actuator 100. This feature advantageously permits actuators of the invention to act in multiple directions as needed for various applications.

In some embodiments, such as the one shown in FIG. 7A-B, the actuator 100 includes a cavity 170 which contains a granular material 171 that is soft and/or pliant at ambient pressures, but which becomes rigid upon application of vacuum via vacuum jamming. In a preferred embodiment of the invention, cavity 110 is defined by and/or part of the non-folding portion 120 of the actuator 100. In use, the actuator 100 is first pressurized or depressurized to induce a desired curvature within the actuator 100. A vacuum is then applied to the cavity 170, causing the granular material 171 to rigidize and hold its shape. This arrangement permits the actuator 100 to hold its bent shape even as the pressure within the actuator 100 returns to ambient pressure.

Figure 8:
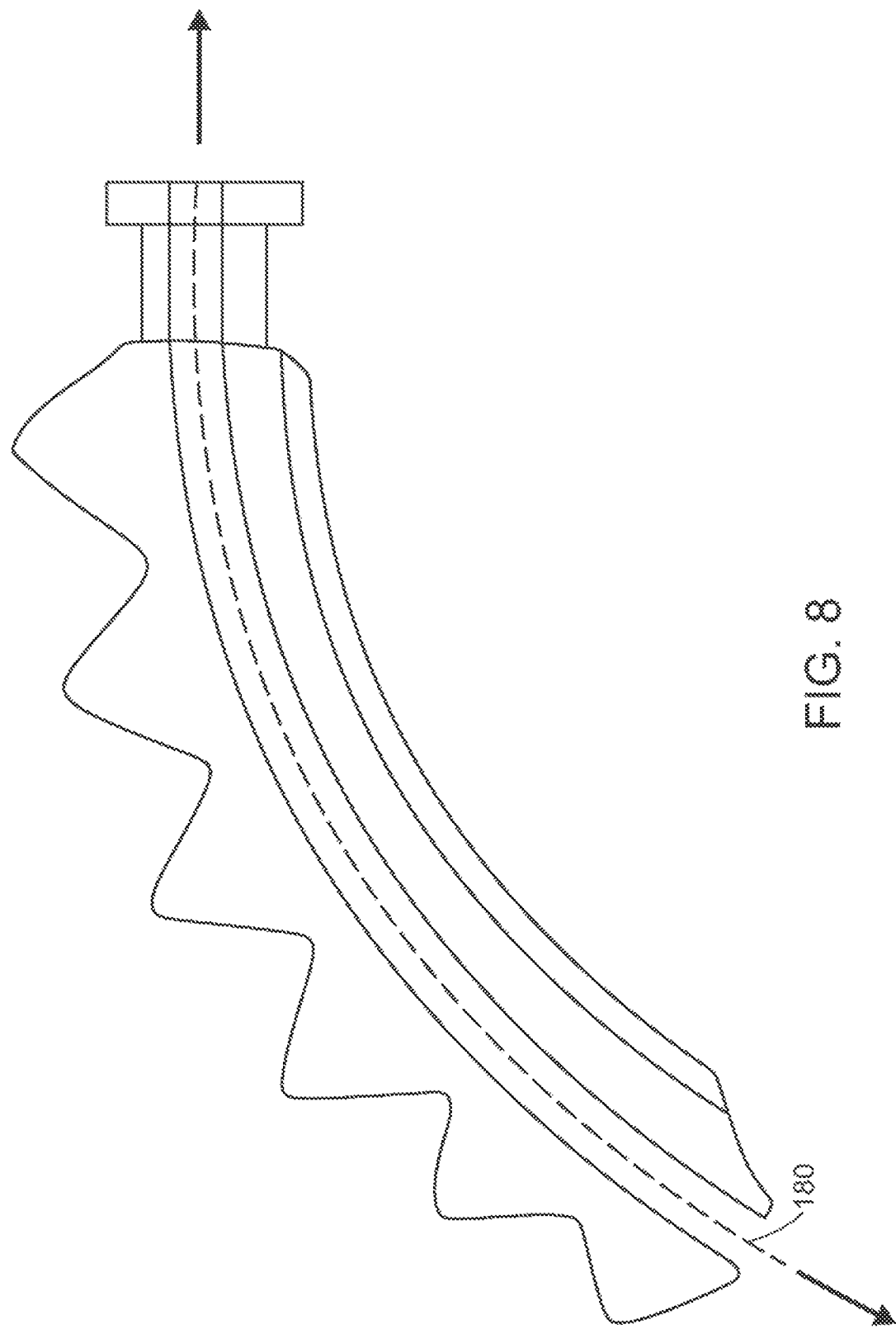
FIG. 8 is a schematic view of an actuator incorporating a working channel according to certain embodiments of the present invention.

In certain embodiments, such as the one shown in FIG. 8A-B, actuators 100 of the invention define one or more working channels 180, which is open to an exterior of the actuator 100 and which extends through at least part of the length 100 of the actuator 100 to permit the introduction or evacuation of materials through the actuator 100. In various embodiments, working channels 180 are used to provide irrigation or suction at a point near the distal end 160 of the actuator 100, or are used to permit the use of spectroscopic, imaging, fiber-optic illumination, electrodes, laser sources, ultrasound probes, etc. through the actuator 100. While the examples set forth in this specification focus on working channels that define a single lumen extending from the proximal end of the actuator to the distal end, it will be understood by those of skill in the art that any number of lumens, and any number of proximal or distal openings, may be used, depending on the specific application for which the actuator is to be used. For instance, an actuator may include a working channel with multiple exit points near the distal end of the actuator for purposes of providing irrigation.

Figure 9A:
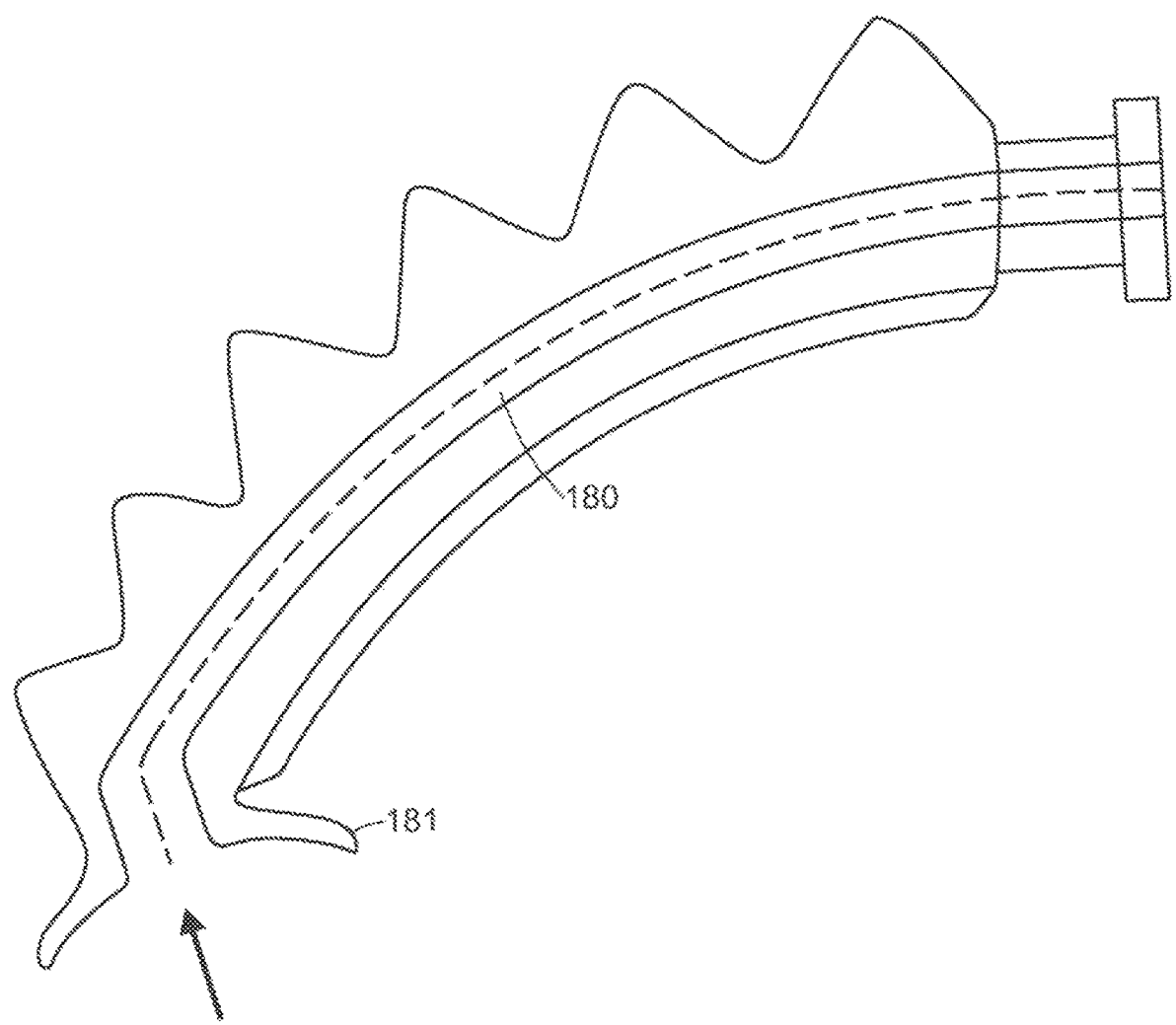
FIG. 9A-E show various schematic views of actuators incorporating surgical instruments, suction cups, or other manipulators according to some embodiments of the present invention.
Figures 9B, 9C, 9D, 9E:
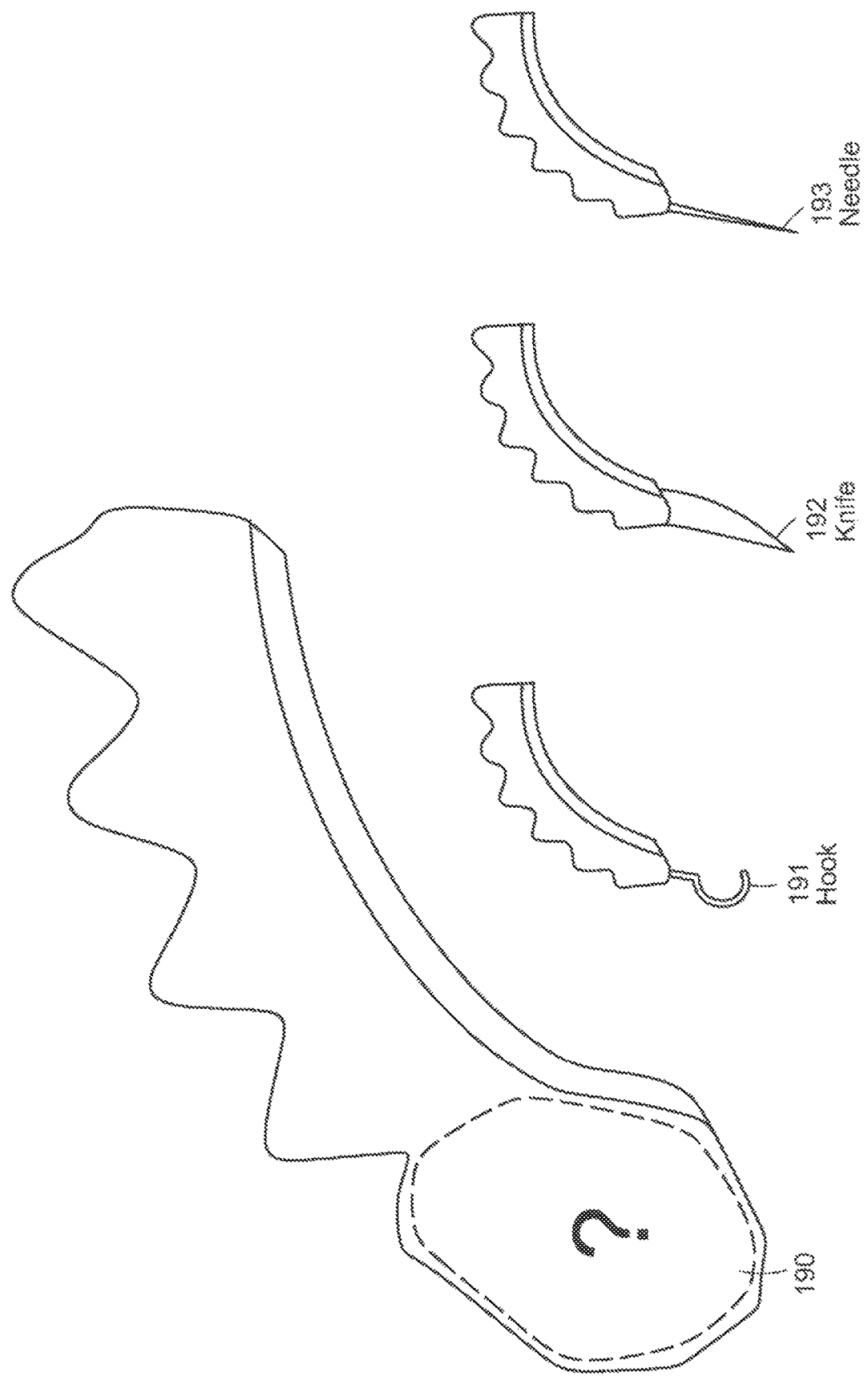
Figure 10:
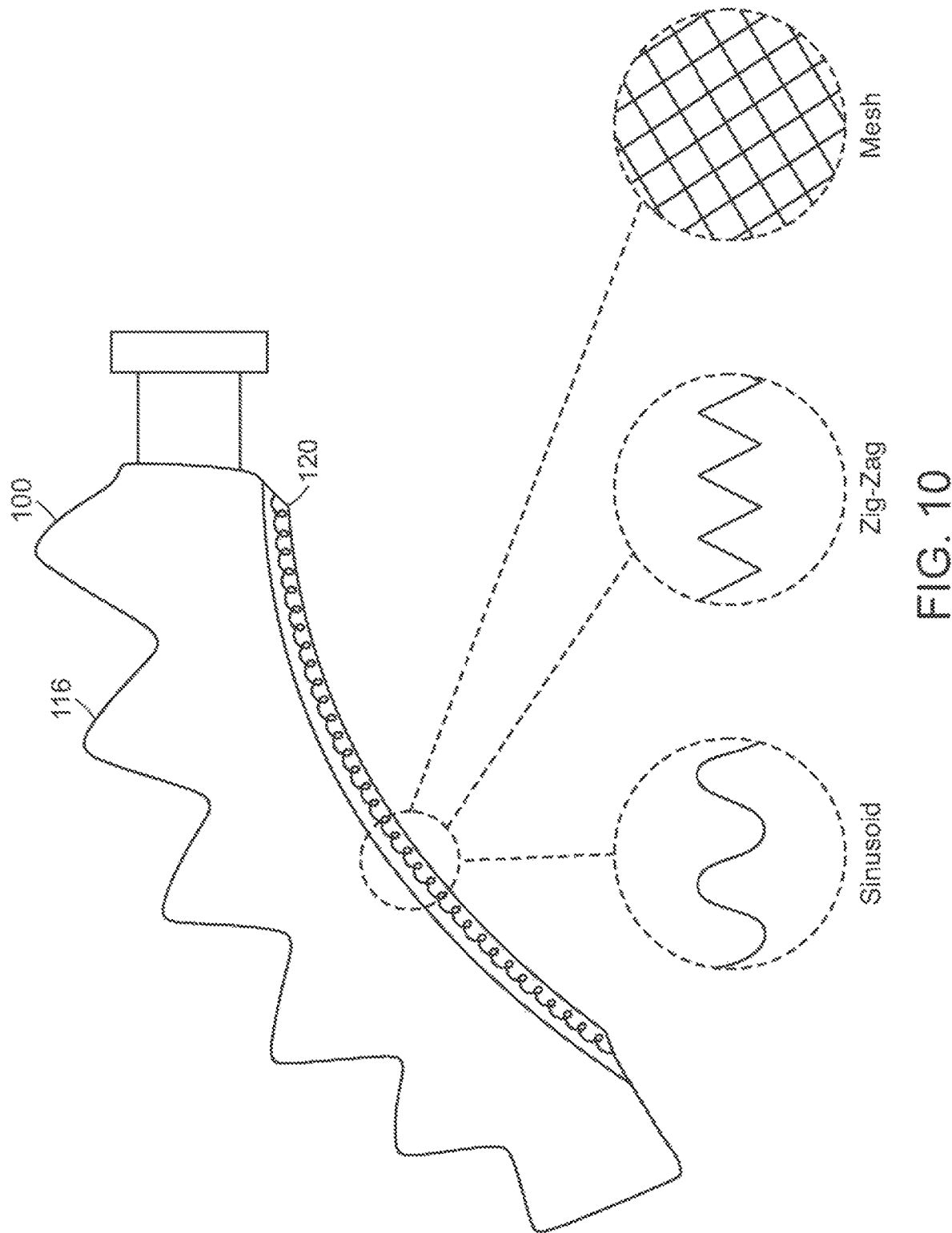
FIG. 10 shows a schematic view of an actuator of the present invention which incorporates a wire.

In addition to, or in lieu of, a working channel 180, actuators can incorporate other features that facilitate manipulation or intervention. These features are generally, but not necessarily, positioned at the distal end 160 of the actuator 100 and/or adjacent to the working channel 180. FIG. 9A, for instance, shows a cross section of an actuator 100 which includes a suction cup 181 disposed at the end of the working channel 180 to permit the distal end 160 of the actuator 100 to grip objects via the application of negative pressure through the working channel 180. FIG. 9B-E shows other tools 190 that are placed on the distal portion 160 of the actuator in various embodiments, including a hook 191, a cutting instrument such as a knife 192, a needle 193, etc.

Actuator 100 includes one or more wires for the delivery of monopolar and/or bipolar current for electrosurgery, and/or to provide current and potential for embedded devices such as sensors. Any sensor which measures a variable of interest can be used with an actuator according to the invention. Variables that can be measured by such sensors include, without limitation, temperature, conductivity, pH, oxygen, pressure, or the concentration of one or more of glucose, creatinine, urea, carbon dioxide, hemoglobin, microbe or virus counts, etc.). The wire or set of wires can be incorporated into a wall of the actuator 100 (e.g. the wall of the non-folding portion 120), located in a working channel 160, or run through the interior of the actuator 100. In cases where the wire or set of wires are embedded in wall of the non-folding portion 120, the wire(s) can be straight or can be have a shape that accommodates the extension, retraction, and/or curvature of the actuator 100, for example coiled, zigzag, sinusoid, grid, meshes, etc.

Figure 11:
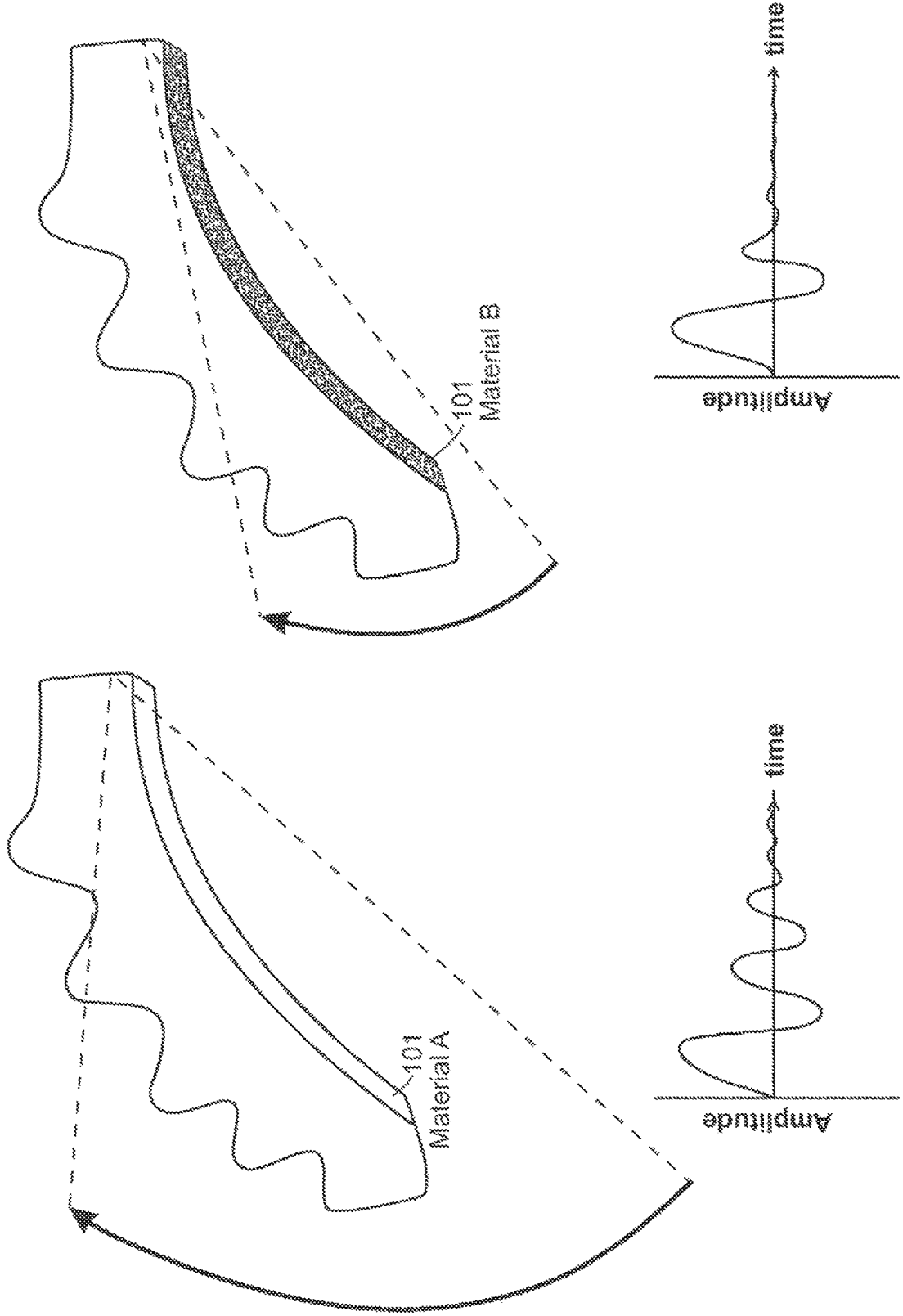
FIG. 11 shows a schematic view of an actuator of the present invention which incorporates one or more vibration-damping materials.
Figure 12:
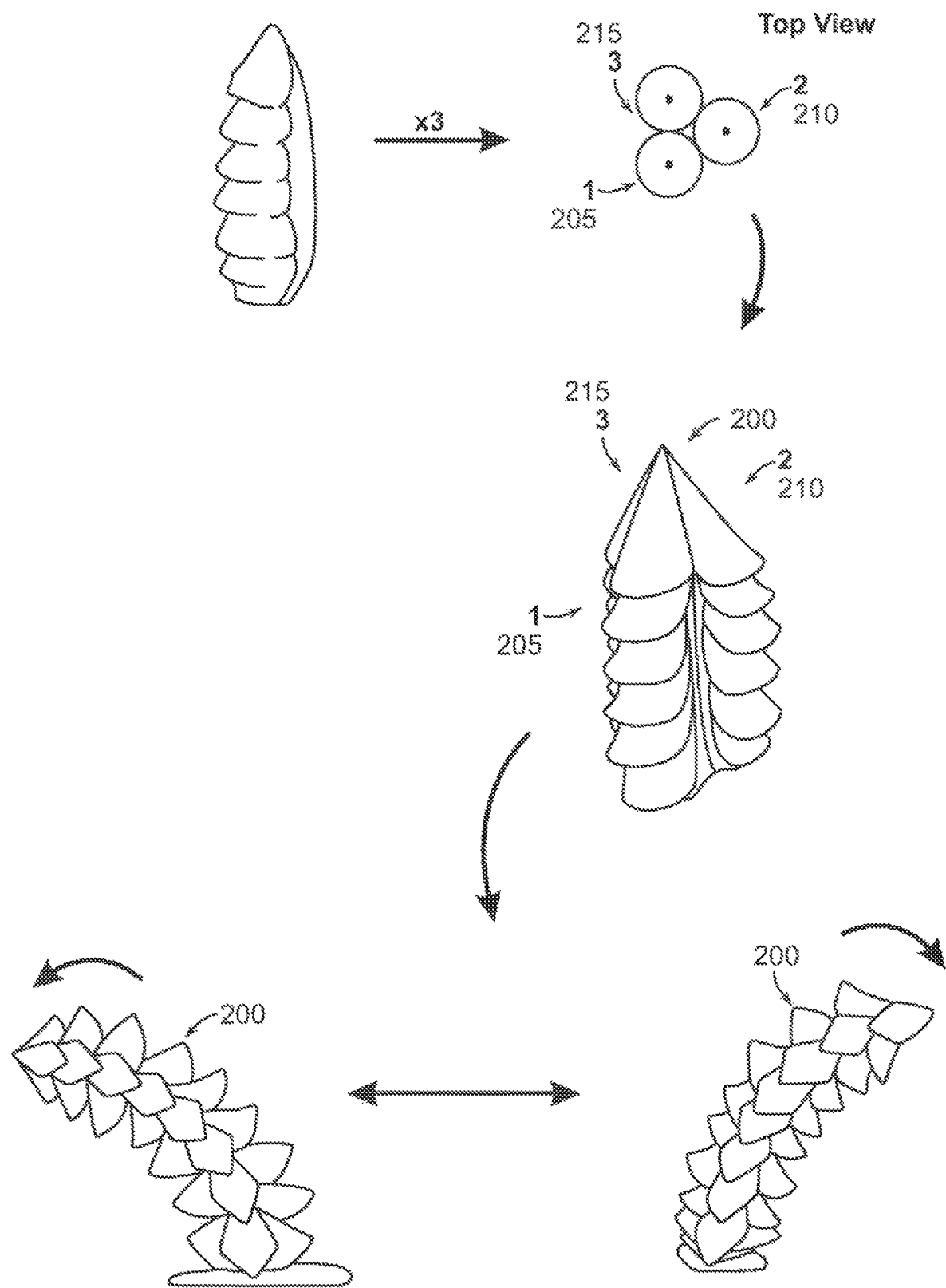
FIG. 12 shows a multidirectional soft robotic actuator according to an embodiment of the present invention.
Figure 15A:
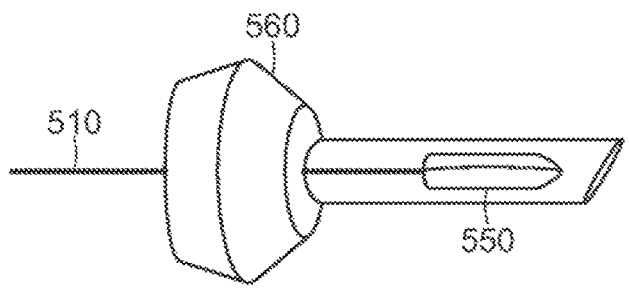
FIG. 15A-F show an exemplary surgical instrument according to an embodiment of the invention.
Figure 15B:
Figure 15C:
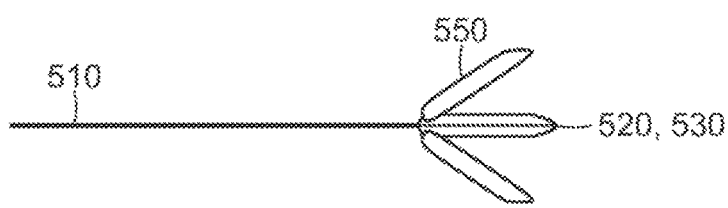
Figure 15D:
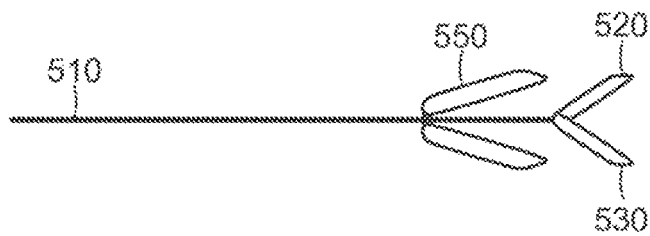
Figure 15E:
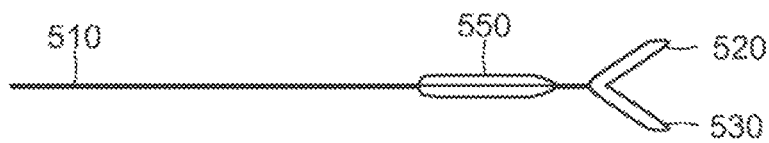
Figure 15F:
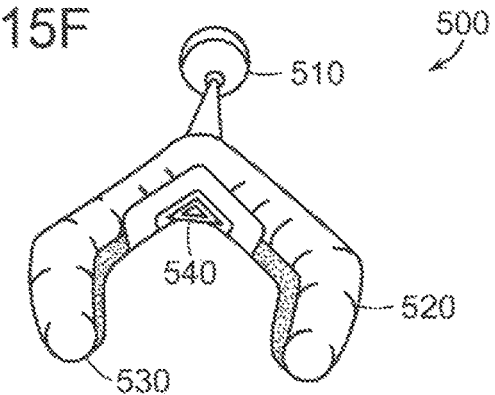

In some embodiments, as shown in FIG. 11, a damping material 101, such as a silicone or urethane foam, is incorporated into the body of the actuator 100, or is otherwise attached to the actuator 100 to dampen oscillation of the actuator during and/or after actuation or after contact with another object. The quantity of the material, and the mechanical properties thereof, are generally chosen to achieve a desired level of damping without increasing the resistance to actuation to an undesirable degree Actuators according to the device can be combined to form larger-scale actuatable structures, such as the multi-directional actuator 200 shown in FIG. 12. As an example, the figure shows three actuators 205, 210, 215, each including a folding portion and a non-folding portion as described above. The actuators are positioned in a more-or-less triangular or circular arrangement, when viewed from the top, in which the non-folding portions of each of the actuators 205, 210, 215 are closely apposed and inward facing while the folding portions face out. By pressurizing or depressurizing a single actuator, the multi-directional actuator 200 undergoes a simple displacement in substantially one direction. However, by pressurizing or depressurizing two or more of the actuators 205, 210, 215 in tandem, complex movements and/or applications of force are made possible. In the example presented above and in FIG. 12, the actuators are identical, and are arranged so as to oppose one another, at least in part. It will be appreciated by skilled artisans, however, that the actuators used in assemblies of the invention may be different, and need not necessarily be arranged in opposition to one another, depending on the type of actuation desired.

Multiple actuators can also be combined to form grasping elements, as shown in FIG. 13A-B. The grasping element 300 as shown incorporates three separate actuators 305, 310, 315, though in other embodiments, any suitable number of actuators can be used, including two, three, four, five, six, etc. The actuators are arranged in a substantially triangular or circular fashion, such that their respective distal ends 306, 311, 316 define an area which decreases as the actuators are actuated (either by pressurization or depressurization, depending on the orientation of the actuators), thereby allowing the grasping element 300 to "grasp" an object using the actuators 305, 310, 315 as "fingers."

The principles of the invention can be used to generate individual actuators which are capable of complex actuating movements, as shown in FIG. 14A-B. An exemplary actuator 400 according to one embodiment, incorporates two groups of unit cells, denoted A and B in the figure, with different heights, pitches, or wall thicknesses. These two groups of unit cells exhibit different pressure sensitivities, and form separate segments which bend at different rates. In the example shown in FIG. 14, each unit B has a lower height than an adjacent unit A, so that, as the actuator is pressurized, its actuation is similar to the action of a finger in that the B segments act as joints while the A segments remain straight.

FIGS. 15 and 16 depict a surgical instrument 500 which utilizes a plurality of "finger" actuators according to the invention. The instrument 500 includes an elongate element 510 that has a distal portion insertable into a patient. The elongate element 510 is preferably a catheter, cannula, or other structure having sufficient column strength to permit insertion within a body and having at least one lumen (not pictured) for supplying pneumatic or hydraulic actuation to a plurality of actuators 520, 530, disposed at a distal end of the elongate element 510. (In preferred embodiments, the elongate element 510 includes a separate lumen for each actuator, thereby enabling the independent actuation of each actuator.) The actuators 520, 530 are preferably shaped to form a "Y" joint with the distal portion of the elongate element 510, and optionally include a spring element 540 disposed at or near the Y joint for urging the actuators 520, 530 apart at their proximal ends. The actuators can incorporate any of the structural features discussed above, and are variously uniform (comprised of identical unit cells) or varied, for instance to incorporate a "joint" comprising one or more unit cells with a higher pressure sensitivity than the other unit cells making up the actuator. At its proximal end, the elongate element 510 is connectable to a pressure source (not pictured) and optionally includes a connector as known in the art, such as a threaded male or female luer connector.

To facilitate insertion of the distal portion of the surgical instrument 500, including the actuators 520, 530, into the body of a patient, and shield them from undesirable mechanical interference, the instrument 500 optionally includes one or more enclosing elements 550. FIG. 15 depicts one embodiment in which the enclosing means is a capsule 551, which can at least partially envelop the actuators 520, 530 during insertion of the instrument 500 into the body of a patient. The capsule 551 is removable in some embodiments, either via mechanical means such as a hinge or spring, or through dissolution or erosion. In other embodiments, such as the one shown in FIG. 15, the capsule is retractable and is capable of being closed after it has been retracted to expose the actuators 520, 530. In still other embodiments, the actuators 520, 530 are initially contained within a retractable sheath (not pictured), which can be withdrawn over the actuators 520, 530 to deploy them.

In use, the distal end pf an instrument 500 according to the invention is placed into the body of a patient using any suitable pathway, including without limitation percutaneously (e.g. through a trocar 560), endoscopically or laparoscopically. Once in place, the enclosing element 550 is withdrawn, opened, or otherwise manipulated to expose the actuators 520, 530 at the distal end of the instrument prior to its use in a medical procedure. Instruments according to the invention are particularly well suited for the manipulation of soft tissues such as bowel tissue, or for use in constrained spaces where rigid instruments could pinch, impinge or otherwise apply undesirable force to tissues and organs adjacent a surgical site of interest.

The actuators 520, 530 are, optionally, able to be collapsed into a space-saving configuration for insertion into the body. For instance, as shown in FIG. 16, the folding portions of the actuators 520,530 may be interdigitated prior to and during delivery to reduce their profile and ease insertion into the body. A removable clip 570 may also be used to constrain the actuators 520, 530 during insertion.

For the sake of simplicity, the examples presented above have focused on embodiments incorporating folding and non-folding portions, but certain actuators according to the embodiments of the invention incorporate first and second extensible portions with varying pressure responsiveness in opposition to one another. The use of two first and second folding portions in opposition to one another can, for instance, give rise to both extension and bending. In addition, the embodiments above have generally focused on linear arrangements of the folding and non-folding portions, but non-linear arrangements can be used as well to give rise to complex actuation movements. For instance, an elongate actuator in which the folding and non-folding portions form a spiral arrangement will actuate to form a helical structure.

In addition, the foregoing examples have focused on folding portions with more-or-less sinusoidal geometries, but it should be appreciated that any geometry which incorporates alternating "peaks" and "valleys" may be suitable for use with various embodiments of the invention.

Finally, this specification has focused on actuators that incorporate "flexible elongate bodies," but it will be appreciated by those of skill in the art that actuators optionally or preferably, depending on the application, comprise materials that are not only flexible (capable of bending or otherwise deforming under the application of a force) but elastic (capable of bending or deforming under a force and returning to its original shape upon withdrawal of the force), stretchable or elastomeric.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

While the present invention has been disclosed with reference to certain embodiments, numerous modifications, alterations and changes to the described embodiments are possible without departing from the sphere and scope of the present invention, as defined in the appended claim(s). Accordingly, it is intended that the present invention not be limited to the described embodiments, but that it has the full scope defined by the language of the following claims, and equivalents thereof

The invention claimed is:

1. A soft robotic actuator, comprising:
an elongate body having a first wall portion and a second wall portion disposed opposite the first wall portion, the second wall portion having a repeating variable profile such that a height of the elongate body varies over its length, wherein
(a) the elongate body defines a sealed void which is capable of being pressurized or depressurized relative to an environment around the actuator,
(b) a distal end of the elongate body is configured to exhibit angular displacement under pressurization in direct proportion to an applied pressure, and
(c) one or more wires configured to supply an electrical current to a load.

2. The soft robotic actuator of claim 1, wherein the load is an embedded sensor.

3. The soft robotic actuator of claim 2, wherein the sensor is configured to measure one or more of temperature, conductivity, pH, oxygen, pressure, or a concentration of glucose, creatinine, urea, carbon dioxide, or hemoglobin, a microbe count, or a virus count.

4. The soft robotic actuator of claim 1, wherein the one or more wires are incorporated into the first wall portion of the elongate body.

5. The soft robotic actuator of claim 4, wherein the one or more wires have a shape configured to accommodate an extension, retraction, or curvature of the soft robotic actuator.

6. The soft robotic actuator of claim 1, wherein the one or more wires are in a coiled, zigzag, or sinusoidal shape.

7. The soft robotic actuator of claim 1, wherein the one or more wires are configured in a mesh or grid.

8. The soft robotic actuator of claim 1, wherein the one or more wires are provided in the sealed void.

9. The soft robotic actuator of claim 1, further comprising a working channel extending through the sealed void and open to an exterior of the soft robotic actuator.

10. The soft robotic actuator of claim 9, wherein the one or more wires are provided in the working channel.

11. The soft robotic actuator of claim 1, wherein a length of the second wall portion increases relative to a length of the first wall portion when the distal end of the elongate body is bent, wherein the distal end of the elongate body is bent when the pressurizing causes a corresponding part of the second wall of the elongate body to unfold.

12. The soft robotic actuator of claim 1, wherein the second wall portion comprises a plurality of unit cells, wherein each unit cell comprises a respective maximal wall height and a respective minimal wall height, wherein the maximal and minimal wall heights are relative to the first wall portion of the corresponding unit cell.

13. The soft robotic actuator of claim 12, wherein the soft robotic actuator has a constant radius of curvature when: (i) the maximal wall heights of each unit cell are substantially equal, and (ii) the minimal wall heights of each unit cell are substantially equal.

14. The soft robotic actuator of claim 12, wherein the soft robotic actuator has a variable radius of curvature when at least one of: (i) the respective maximal wall heights of a first unit cell and a second unit cell, of the plurality of unit cells, are different, (ii) a wall thickness of the first unit cell is different than a wall thickness of the second unit cell, and (iii) a pitch distance between a first two adjacent unit cells of the plurality of unit cells is different than a pitch distance between a second two adjacent unit cells of the plurality of unit cells.

15. The soft robotic actuator of claim 1, wherein the bend comprises one or more of: (i) multi-directional bending of the elongate body, and (ii) twisting of the elongate body, responsive to the pressurizing.

16. The soft robotic actuator of claim 1, wherein a degree of actuation of the soft robotic actuator is based on an amount of pressure in the pressurized sealed void.

17. The soft robotic actuator of claim 16, wherein the degree of actuation is further based on one or more of: (i) the height of the elongate body, (ii) a respective pitch difference between two adjacent unit cells, of a plurality of unit cells of the second wall portion, and (iii) a respective wall thickness of each unit cell.

18. The soft robotic actuator of claim 1, wherein the elongate body curves around the first wall portion when bent.

19. The soft robotic actuator of claim 1, wherein the elongate body comprises an elastic elongate body that returns to an original shape in the absence of pressurization in the sealed void.

20. A method comprising:
providing a soft robotic actuator according to claim 1; and
pressurizing or depressurizing the sealed void.

* * * * *